(12) United States Patent
Driggs et al.

(10) Patent No.: US 10,326,676 B1
(45) Date of Patent: Jun. 18, 2019

(54) AUTOMATED RISK ASSESSMENT BASED ON MACHINE GENERATED INVESTIGATION

(71) Applicant: ExtraHop Networks, Inc., Seattle, WA (US)

(72) Inventors: Edmund Hope Driggs, Seattle, WA (US); Jesse Abraham Rothstein, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 16/243,001

(22) Filed: Jan. 8, 2019

(51) Int. Cl.
    *H04L 12/26* (2006.01)
(52) U.S. Cl.
    CPC .......... *H04L 43/0876* (2013.01); *H04L 43/14* (2013.01); *H04L 43/16* (2013.01)
(58) Field of Classification Search
    None
    See application file for complete search history.

(56) References Cited

U.S. PATENT DOCUMENTS

| | | | | |
|---|---|---|---|---|
| 6,597,777 B1 * | 7/2003 | Ho | | H04L 41/0896 370/235 |
| 7,917,647 B2 * | 3/2011 | Cooper | | H04L 41/046 370/229 |
| 8,621,615 B2 * | 12/2013 | Zhao | | H04L 43/00 370/252 |
| 9,166,994 B2 * | 10/2015 | Ward | | H04L 63/1425 |
| 9,729,416 B1 * | 8/2017 | Khanal | | H04L 43/0823 |
| 9,756,061 B1 * | 9/2017 | Roeh | | H04L 63/0245 |
| 10,116,679 B1 * | 10/2018 | Wu | | H04L 63/1425 |
| 2003/0188189 A1 * | 10/2003 | Desai | | H04L 63/104 726/23 |
| 2004/0010718 A1 * | 1/2004 | Porras | | H04L 41/142 726/23 |
| 2005/0044406 A1 * | 2/2005 | Stute | | C12Q 1/6804 726/4 |
| 2005/0207413 A1 * | 9/2005 | Lerner | | G06F 21/552 370/389 |
| 2010/0088670 A1 * | 4/2010 | Paster | | H04L 43/022 717/106 |
| 2012/0233311 A1 * | 9/2012 | Parker | | H04L 43/00 709/224 |

(Continued)

*Primary Examiner* — Bunjob Jaroenchonwanit
(74) *Attorney, Agent, or Firm* — John W. Branch; Lowe Graham Jones PLLC

(57) ABSTRACT

Embodiments are directed to monitoring network traffic using a network computer. The network computer provides anomaly information associated with anomalies that may be associated with monitored network traffic. An inference engine may determine the users associated with the anomalies based on the monitored network traffic. A communication channel associated with the users may be determined based on the anomalies and the monitored network traffic such that the communication channel may be separate from the monitored network traffic. The communication channel may be employed to provide investigative agents to the users. Investigative information may be collected from the investigative agents over the communication channel. The inference engine may provide a risk value that is associated with the anomalies based on the investigative information.

24 Claims, 11 Drawing Sheets

(56) References Cited

U.S. PATENT DOCUMENTS

| | | | |
|---|---|---|---|
| 2013/0227689 A1* | 8/2013 | Pietrowicz | G01R 1/20 |
| | | | 726/23 |
| 2013/0305357 A1* | 11/2013 | Ayyagari | H04W 12/06 |
| | | | 726/22 |
| 2014/0013434 A1* | 1/2014 | Ranum | H04L 63/145 |
| | | | 726/24 |
| 2015/0341379 A1* | 11/2015 | Lefebvre | H04L 63/1425 |
| | | | 726/22 |
| 2018/0013650 A1* | 1/2018 | Khanal | H04L 43/0823 |
| 2018/0145995 A1* | 5/2018 | Roeh | H04L 63/0245 |

* cited by examiner

AUTOMATED RISK ASSESSMENT BASED ON MACHINE GENERATED INVESTIGATION

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

In complex networks, one or more services or systems may identify anomalous network activity. However, distinguishing false positives from actual problems may be difficult given the dynamic characteristics of modern computing networks. Accordingly, in some cases, anomaly detection may be configured to be over protective such that it may cause disadvantageous disruptions to authorized operations. Likewise, in some cases, reducing the sensitivity of anomaly detection may result in missed threats that may put an organization in jeopardy. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
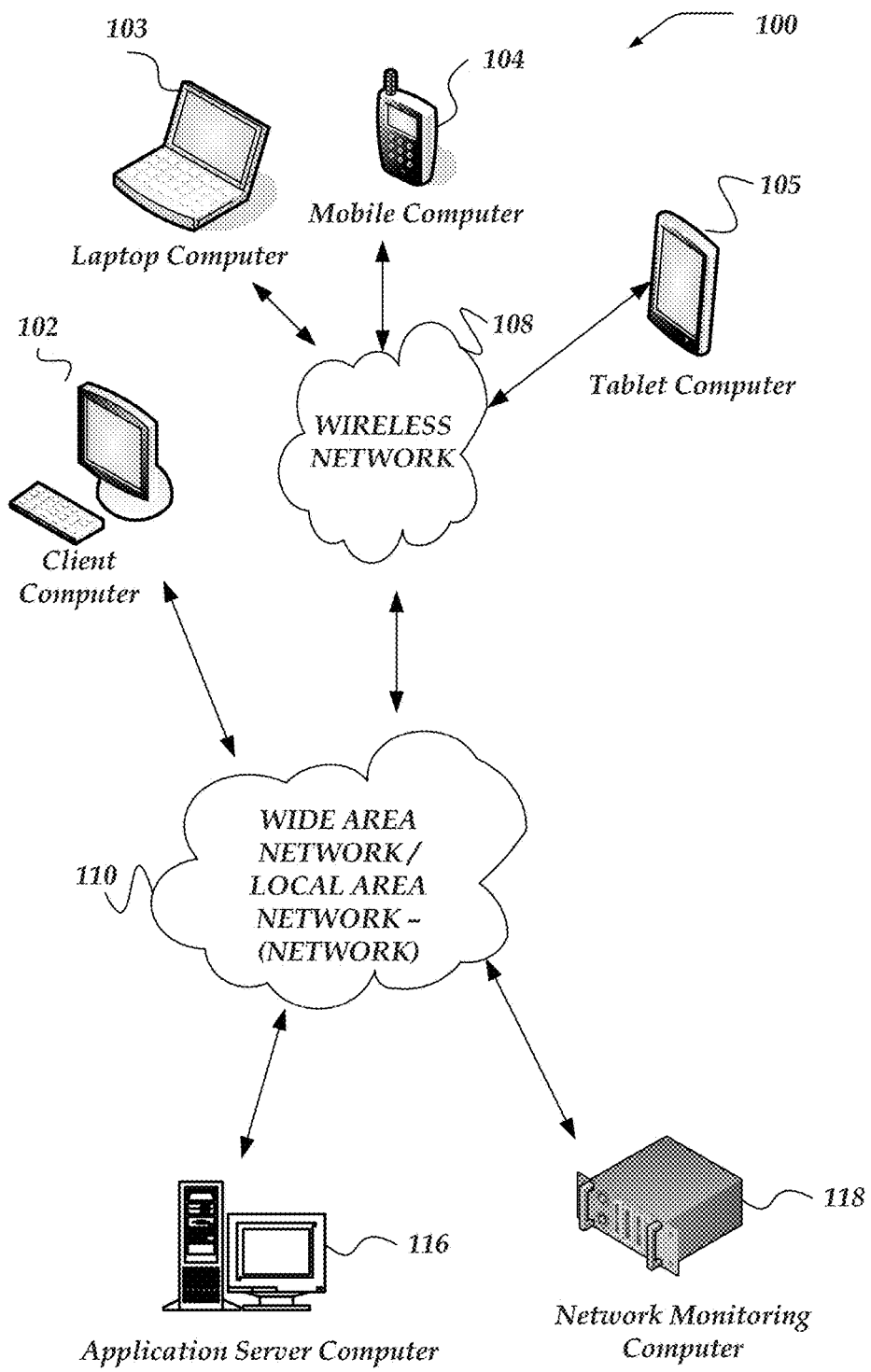
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiments, the NMC may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein the term "anomaly" refers to the actions or activities associated with user behavior on a monitored network that is associated with one or more monitored metrics that are determined to deviate from what is standard, normal, or expected. Also, in some cases, an anomaly may be associated with a pattern of behavior, sequence or series of metrics, or the like. In some embodiments, anomalies may be associated one or more user, network flows, connections, entities, or the like. Further, in some embodiments, anomalies may be detected or determined by one or more anomaly detection services or processes and then reported to an NMC, or the like. Accordingly, anomaly detection is not limited to actions performed by the NMC.

As used herein the term "investigative agent" refers to an application, process, or the like, that is generated or provided by an NMC to one or more entities that may be associated with one or more anomalies. Generally, in response to receiving notifications or other information associated with an anomaly, the NMC may provide an investigative agent to one or more entities associated with the anomalies to collect addition information to determine a risk level of the anomaly.

As used herein the term "anomaly information" refers to information describing or identifying an anomaly. Anomaly information is provided by anomaly detection services. Anomaly information may be provided by messages, events, API calls, log records, or the like. The content of anomaly information depends on the configuration or capabilities of the originating anomaly detection service. For example, anomaly information may include one or more of, anomaly identifiers, anomaly descriptions, timestamps, user information, endpoint information, anomaly category, anomaly type, metrics that are associated with the anomaly, or the like, or combination thereof. In some cases, anomaly information may be provided using XML, JSON, text records, API parameters, HTTP fields, key-value pairs, or the like.

As used herein the term "investigative information" refers to information that is determined or collected during the investigation of an anomaly. Investigative information may be comprised of various data and values depending on the anomaly being investigated, including, metrics collected by one or more investigative agents, user behavior information, user input, or the like, or combination thereof.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

As used herein the term "target user" refers to a user that may be associated with an anomaly such that one or more investigative agents may be directed to collect investigative information associated that with that user.

As used herein the term "target entity" refers to an entity that may be associated with an anomaly such that one or more investigative agents may be directed to collect investigative information associated that with that entity.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic using one or more network computers. In one or more of the various embodiments, a monitoring engine may be instantiated to provide anomaly information that may be associated with one or more anomalies that may be associated with monitored network traffic. Accordingly, in one or more of the various embodiments, an inference engine may be instantiated to performs additional actions.

In one or more of the various embodiments, the inference engine may be arranged to determine one or more users that may be associated with the one or more anomalies that may be associated with one or more portions of the monitored network traffic.

In one or more of the various embodiments, the inference engine may be arranged to determine a communication channel that may be associated with the one or more users based on the one or more anomalies and the one or more portions of the monitored network traffic such that the communication channel may be separate from the monitored network traffic.

In one or more of the various embodiments, the inference engine may be arranged to employ the communication channel to provide one or more investigative agents to the one or more users.

In one or more of the various embodiments, the inference engine may be arranged to collect investigative information from the one or more investigative agents over the communication channel. In one or more of the various embodiments, collecting the investigative information may include monitoring one or more interactions of the one or more users with the one or more investigative agents. In one or more of the various embodiments, collecting the investigative information may include: employing the one or more investigative agents to determine one or more target metrics that may be associated with one or more of one or more target entities, the one or more users, or the like; and employing the one or more investigative agents to provide the investigative information to the inference engine using the communication channel.

In one or more of the various embodiments, collecting the investigative information may also include: employing the one or more investigative agents to determine one or more target metrics that may be associated with one or more interactions with the one or more users; and employing the one or more investigative agents to provide the one or more target metrics to the inference engine using the communication channel.

In one or more of the various embodiments, the inference engine may be arranged to provide a risk value that is associated with the one or more anomalies based on the investigative information.

In one or more of the various embodiments, the inference engine may be arranged to employ one or more of an anomaly engine on the one or more network computers, one or more network monitoring computers, one or more services, or the like, that may be separate from the one or more network computers to provide the anomaly information.

In one or more of the various embodiments, the inference engine may be arranged to annotate the anomaly information to include one or more attributes based on one or more metrics that may be associated with the one or more portions of the monitored network traffic that is associated with the one or more anomalies. In some embodiments, the inference engine may be arranged to further determine the one or more investigative agents based on the annotated anomaly information. And, in one or more of the various embodiments, the inference engine may be arranged to employ the annotated anomaly information to further determine the communication channel.

In one or more of the various embodiments, the inference engine may be arranged to determine one or more remediation actions based on the investigative information such that the one or more remediation actions may include quarantining an endpoint, blocking network traffic, locking a user account, or the like, or combination thereof.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Further, in some embodiments, client computers may be arranged to receive or host one or more investigative agents that may be gathering information associated with an anomaly that has been detected in the networks.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
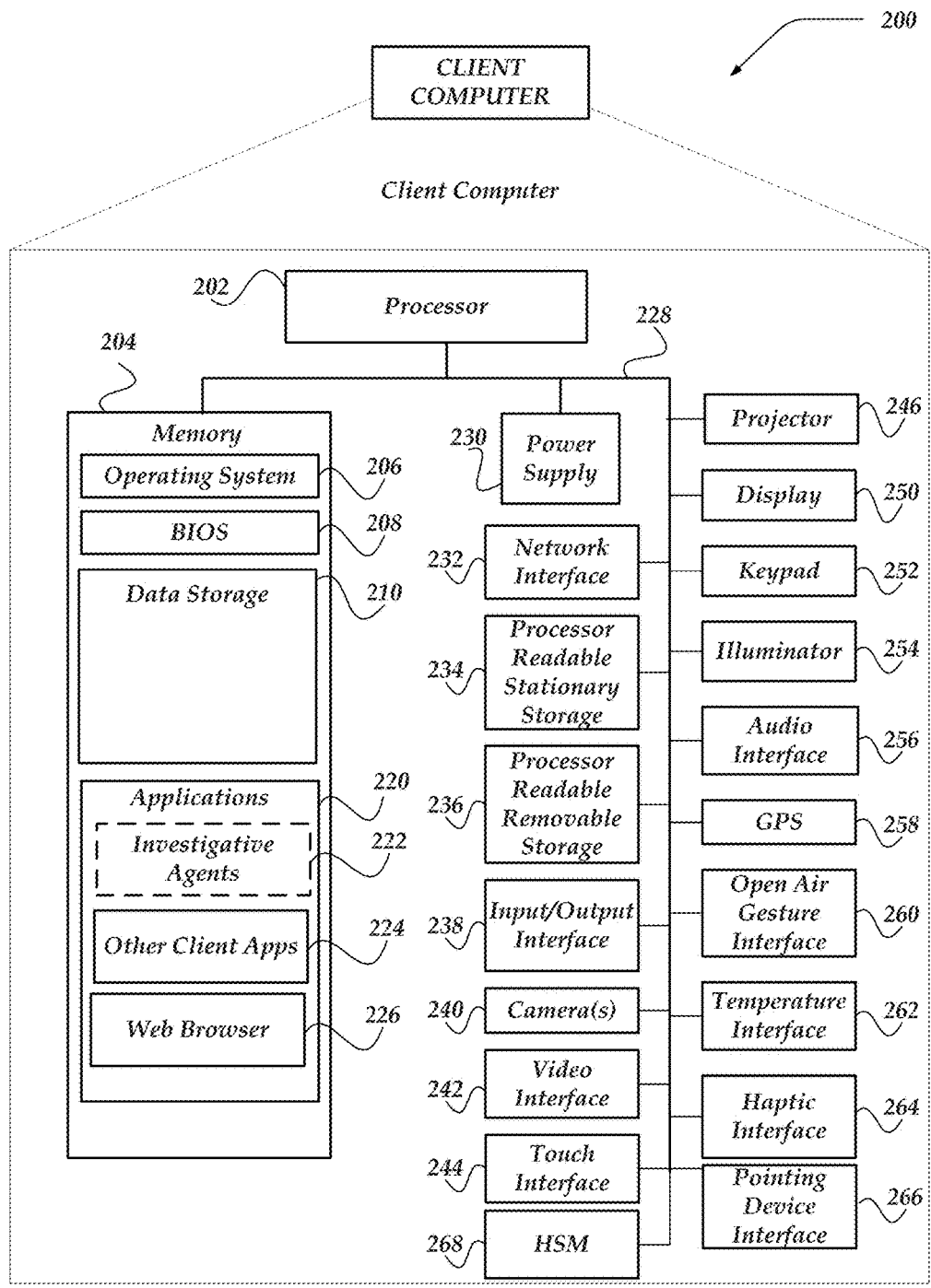
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, investigative agents 222, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers. Note, in some embodiments, investigative agents 222 may be present if provided by an NMC, or the like, to investigate one or more anomalies. Otherwise, in some embodiments, investigative agents may be absent. Thus, the block illustrating investigative agents 222 is represented using dashed lines rather than solid lines to indicate that in some embodiments investigative agents may be transient.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
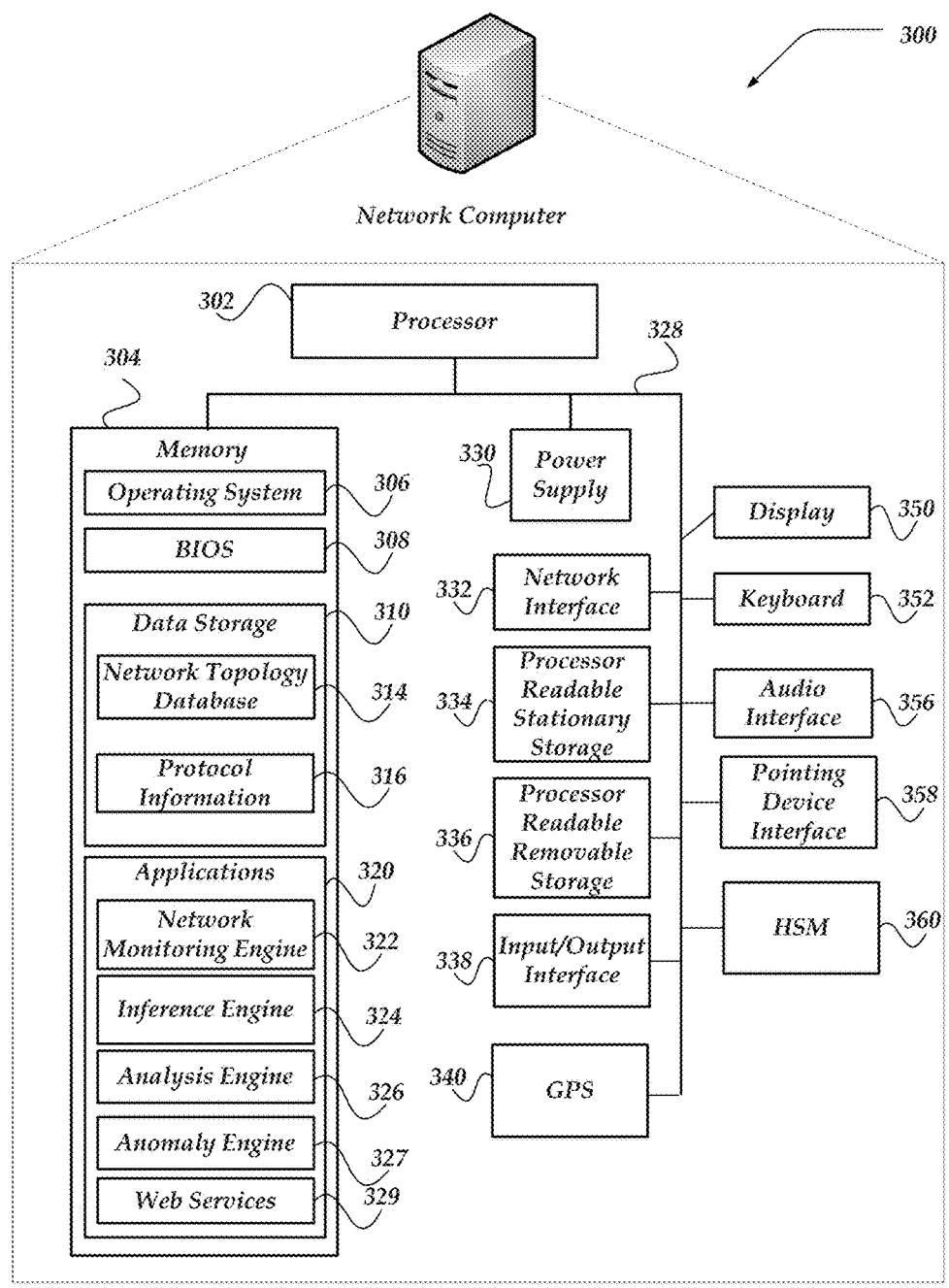
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, inference engine 324, analysis engine 326, anomaly engine 327, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, reports, as well as internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, network topology database 314, protocol information 316, or the like. In some embodiments, network topology database 314 may be a data store that contains information related to the topology of one or more network monitored by a NMC, including one or more device relation models. And, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, inference engine 324, analysis engine 326, anomaly engine 327, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, inference engine 324, analysis engine 326, anomaly engine 327, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, inference engine 324, analysis engine 326, anomaly engine 327, web services 329, or the like, may be provisioned and de-commissioned automatically.

Also, in one or more of the various embodiments, network monitoring engine 322, inference engine 324, analysis engine 326, anomaly engine 327, web services 329, or the like, may be located in virtual servers running in a cloud-based computing environment rather than being tied to one or more specific physical network computers. Likewise, in some embodiments, one or more of network monitoring engine 322, inference engine 324, analysis engine 326, anomaly engine 327, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
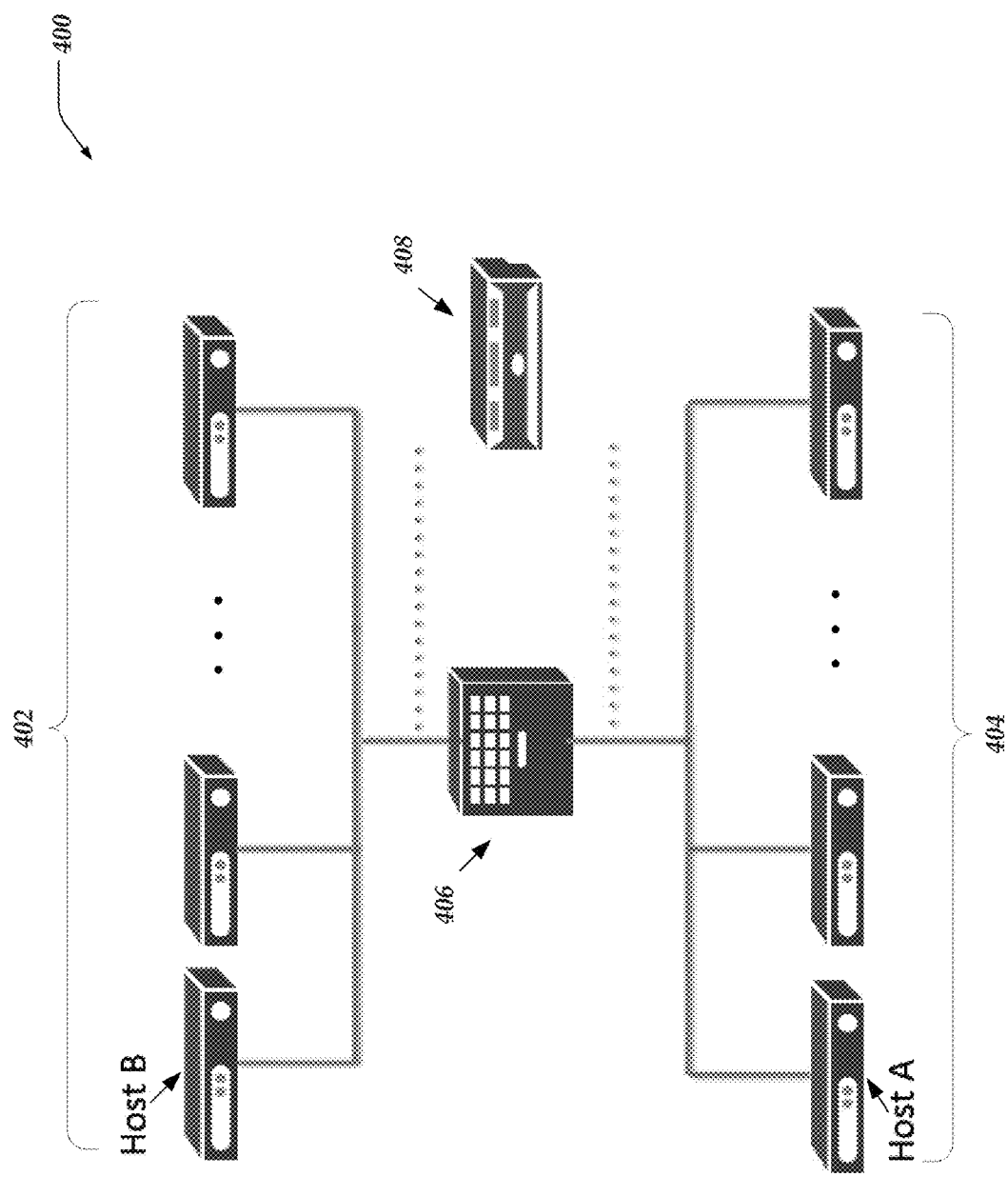
FIG. 4 illustrates a logical architecture of a system for automated risk assessment based on machine generated investigations in accordance with one or more of the various embodiments.

FIG. 4 illustrates a logical architecture of system 400 for automated risk assessment based on machine generated investigations in accordance with one or more of the various embodiments. System 400 may be arranged to include a plurality of network devices or network computers on first network 402 and a plurality of network devices or network computers on second network 404. Communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs may be arranged to determine one or more entities (e.g., users or endpoints) that may be responsible or associated with one or more anomalies. In some embodiments, anomalies may be determined based on monitoring or analysis performed by the NMC. In one or more of the various embodiments, one or more of the anomalies may be detected or determined by other services or processes that may be separate or independent from the NMCs. Accordingly, in some embodiments, the anomaly detecting services or processes may communicate information (e.g., anomaly information) about anomalies they have detected to the NMCs to enable the NMCs to perform additional risk assessments.

In one or more of the various embodiments, additional risk assessments of anomalies may include providing one or more investigative agents to one or more target users or target entities that may be associated with the anomalies. Further, in some embodiments, investigative agents may be provided over alternative communication channels that may be fully or partially independent from the communication channels or networks associated with the detected anomalies. In some embodiments, alternative communication channels may include alternative/secure networks that may be accessible to target users, such as, mobile devices, smart phones, tablets, pagers, laptops, secured terminal, or the like. In some embodiments, one or more alternative communication channels may be provided or hosted on one or more target entities, such as, SSH tunnels, VPNs, or the like.

Accordingly, in one or more of the various embodiments, the investigative agents may collect additional information or metrics (e.g., investigative information) that may be provided to the NMCs. In some embodiments, some or all of the investigative information may be collected using machine generated challenges that require one or more inputs or responses from users that may be associated with the anomaly or the investigation of the anomaly. For example, in some embodiments, an investigative agent may send a message to a user that requires a response. Also, for example, machine generated challenges may include displaying a user-interface (e.g., pop-up window, dialog box, or the like) to provide a challenge that the user is expected to answer. This additional information may be employed by the NMCs to further assess the risk level of the detected anomalies. Thus, in some embodiments, mitigation or remediation actions may be taken or recommended based on the risk level assessment.

In some embodiments, some or all of the information provided by the investigative agents may be employed by the inference engine to provide feedback that may be used to train or otherwise develop machine learning models that may be employed to assess the risk level of future anomalies.

Figure 5:
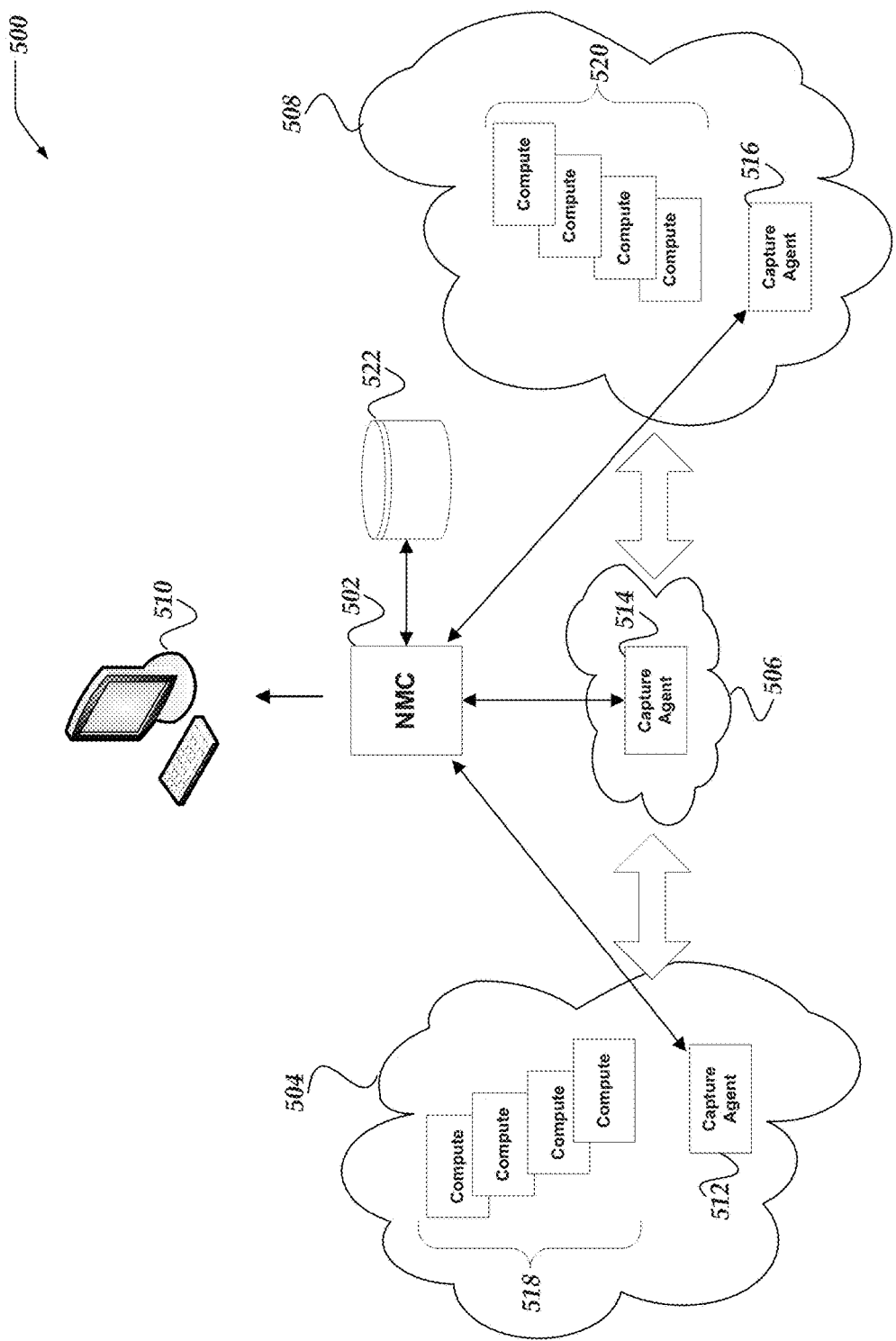
FIG. 5 illustrates a logical schematic of a system for automated risk assessment based on machine generated investigations in accordance with one or more of the various embodiments.

FIG. 5 illustrates a logical schematic of system 500 for automated risk assessment based on machine generated investigation in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that are distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that may capture metrics for selected portions of the monitored networks. Also, in some embodiments, in networks that have groups or clusters of the same or similar entities, capture agents may be selectively installed on one or more entities that may be representative of entire groups or clusters of similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, applications, services, or the like, subject to network monitoring by one or more NMCs. (See, FIG. 4, as well).

In this example, for one or more of the various embodiments, capture agents, such as capture agent 512 may be arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522.

Figure 6:
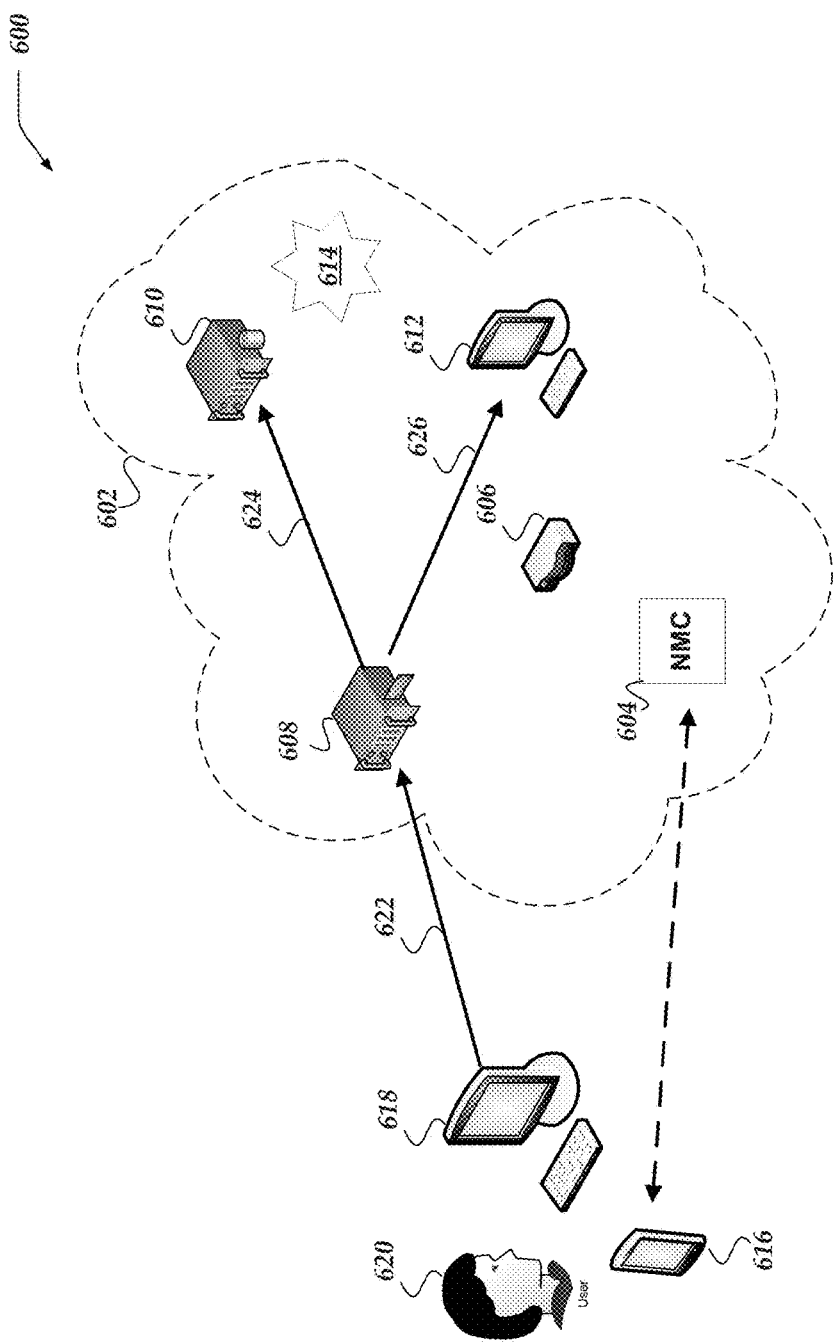
FIG. 6 illustrates a logical schematic of a system for automated risk assessment based on machine generated investigations in accordance with one or more of the various embodiments.

FIG. 6 illustrates a logical schematic of system 600 for automated risk assessment based on machine generated investigation in accordance with one or more of the various embodiments. In this example, system 600 includes one or more monitored networks represented by networking environment 602. In this example, for some embodiments, NMC 604 may be arranged to monitor network activity that may occur in environment 602. Accordingly, in this example, NMC 604 may be arranged to monitor network activity that may be associated with network device 606, server computer 608, network computer 610, desktop computer 612, or the like. Accordingly, in some embodiments, NMC 604 may be arranged to monitor network traffic or collect metrics associated with various activities or interactions that may occur in environment 602.

In this example, for some embodiments, anomalous network activity, such as, anomaly 614, may be detected by NMC 604 or another anomaly detection service or process. Accordingly, in one or more of the various embodiments, NMC 604 may associate anomaly 614 with one or more anomaly profiles and provide an investigative agent to a client computer, such as, client computer 616 which in this example may be owned or operated by a user, such as, user 620. In response to the occurrence of anomaly 614, user 620 may receive a notification over an alternative communication channel indicating both the occurrence of anomaly 614 and that an investigative agent has been deployed.

In one or more of the various embodiments, NMCs, such as, NMC 604 may be arranged to employ one or more machine learning facilities to detect or identify one or more anomalies. For example, an inference engine, such as, inference engine 326 may be arranged to train one or more anomaly classifiers based on archived network traffic or other historical information.

In one or more of the various embodiments, the investigative agent may be arranged to collect information related to anomaly 614. In some embodiments, the information may be provided to NMC 604 for use in determining a risk level that may be associated with anomaly 614. For example, in some embodiments, if NMC 604 has determined that anomaly 614 is associated with user 620, the investigative agent may provide the location of client computer 616 (e.g., GPS coordinates, or the like) to NMC 604. Accordingly, in this example, if the anomaly is associated with credential impersonation, the location of workstation 618 may be compared with the location of tablet 616 for determining if credential impersonation caused the anomaly. Thus, in this example, if the location of client computer 616 and the endpoint (e.g., workstation 618) associated with user 620 and the anomaly is different, the NMC may be arranged to consider the likelihood of credential impersonation higher than if the location of client computer 620 and workstation computer 618 are at the same or similar location.

Also, for example, in some embodiments, an investigative agent may provide a user-interface that requests one or more inputs or responses from user 620 that may be considered during a risk assessment of anomaly 614. For example, in some embodiments, the investigative agent may be arranged to display a user interface on a mobile device, such as, client computer 616, that enables user 620 to confirm that they are intentionally performing the actions that may have triggered the anomaly.

Accordingly, in one or more of the various embodiments, if user 620 is associated with activity that may be malicious, such as, uncharacteristically accessing sensitive documents or databases, the investigative agent may enable user 620 to confirm that the activity is not malicious. Accordingly, in one or more of the various embodiments, NMC 604 may be arranged to employ the investigative information collected by the investigative agent to evaluate if the activity is malicious.

In one or more of the various embodiments, absent the investigative information provided by the investigative agent, NMC 604 may be limited to ignoring the potential for malicious activity because the activity is being performed by an authenticated user. Alternatively, in some embodiments, NMC 604 may disrupt otherwise authorized activity because it appears to be anomalous. The information collected by the investigative agent may be employed to help discern anomalies caused by malicious activity from anomalies caused by good faith users performing authorized activities that just happen to be anomalous.

Note, in some embodiments, anomalies may be distinguished from malicious activity or unauthorized intrusion. Some anomalies may be associated with authorized user behavior that happens to be unusual whereas malicious activities may be associated with user behavior that is unauthorized. Thus, the investigative agents may be used to obtain investigative information to help determine if an anomaly is associated with malicious activity or authorized activity.

In one or more of the various embodiments, NMCs, such as, NMC 604 may be arranged to associate risk profiles with anomaly profiles associated with the anomalies that triggered the deployment of the investigative agents in the first place. In some embodiments, this may include associating investigation profiles that had good outcomes as well as investigation profiles that may have had bad outcomes. Accordingly, in one or more of the various embodiments, if an anomaly occurs again, the NMC may provide investigation information to investigators that includes one or more investigation profiles that were previously used during the past investigations of the other anomalies associated with the same anomaly profile other previously encountered anomalies. In some embodiments, this may include investigation profiles that may be associated with successful investigations or unsuccessful investigations as indicated by status information or other metrics associated with the one or more investigation profiles.

In one or more of the various embodiments, NMCs may be arranged to determine that an anomaly has a high risk level if investigative agents are unable to provide information to assess the risk level. For example, if an investigative agent deployed to client computer 616 does not provide the expected information or user interactions, NMC 604 may be arranged to consider anomaly 614 as malicious activity and take appropriate actions.

In one or more of the various embodiments, NMCs may be arranged to provide or employ one or more anomaly profiles that model classes or types of anomalies. In some embodiments, one or more anomaly profiles may be comprised of rules that may determine which anomalies match a given profile based on one or more characteristics of the anomalies. In some embodiments, various characteristics associated with an anomaly may be used to determine its corresponding anomaly profile. For example, in some embodiments, anomalies associated with database servers may be defined to be associated with anomaly A. And, for example, anomalies associated with file system activity may be defined to be associated with anomaly B, and so on. Likewise, in some embodiments, anomaly profiles may be associated with specific users, user groups, user roles, organizations, departments, hardware class, networks, sub-networks, or the like.

In some embodiments, NMCs may be arranged to determine or analyze the network traffic that is associated with anomalies. In some embodiments, monitoring services that detect anomalies in a monitored environment may provide partial information about the anomalies that are detected to NMC. Accordingly, in one or more of the various embodiments, NMCs may be arranged to determine additional information associated with anomalies based on the network traffic that is associated with a given anomaly. For example, in some embodiments, a monitoring service may provide anomaly information, such as, a network address, process identifiers, timestamp of the event, or the like, the an NMC. Accordingly, in some embodiments, NMCs may be arranged to determine additional information, such as, application types, communication protocols, related network traffic, additional relevant timestamps, user identity, or the like, based on an analysis or evaluation of the network traffic associated with the reported anomaly. For example, an NMC that is provided anomaly information that includes a timestamp, an entity or endpoint identifier, and an associated user Id may be arranged to determine a timestamp that is associated with when the user logged onto to the endpoint sometime before the occurrence of the anomaly.

Likewise, in some cases, a user directly associated with an anomaly may be a system user associated with the application that generated the anomaly rather than a user that is interacting with application. For example, an Apache webserver running on a Unix-type operating system may be associated with a system user named apache. Accordingly, for this example, in some embodiments, some webserver anomalies may be reported as being associated with the user apache rather than the client user that actually performed that activity that triggered the anomaly.

Accordingly, in one or more of the various embodiments, NMCs may be arranged to evaluate the network traffic associated with an anomaly to determine additional relevant information that is not included with the anomaly information. Continuing with the previous example, the NMC may analyze the network traffic associated with the webserver anomaly to determine the client user that may be responsible for the anomaly. For example, the NMC may observe the ingress network traffic or egress network traffic associated with the webserver to determine the user identities of users accessing the webserver, and so on.

In one or more of the various embodiments, NMCs may be arranged to automatically generate anomaly profiles based on anomaly characteristics and information provided by investigative agents.

In one or more of the various embodiments, if anomaly information is provided to an NMC, the NMC may determine one or more users that may be associated with the anomaly based on configuration information. In some embodiments, NMCs may be arranged to execute one or more rules that define or describe associations between users and anomalies. In some embodiments, these rules may include static mapping between users and anomalies or anomaly types.

Figure 7:
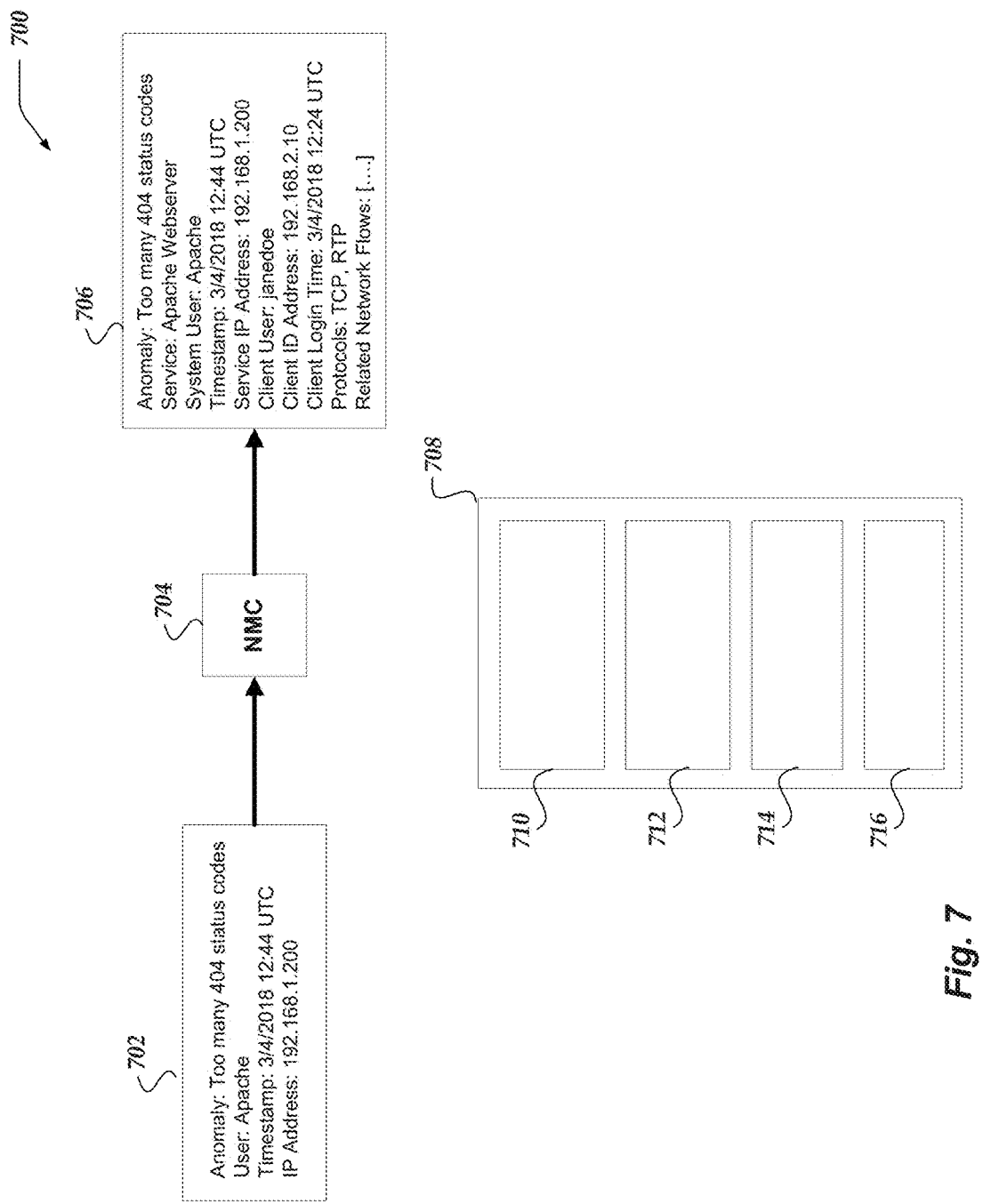
FIG. 7 illustrates a logical schematic of a system that shows how anomaly information may be annotated with additional information based on network monitoring in accordance with one or more of the various embodiments.

FIG. 7 illustrates a logical schematic of system 700 that shows how anomaly information may be annotated with additional information based on network monitoring in accordance with one or more of the various embodiments. In some embodiments, as discussed above, one or more services may provide anomaly information, such as, anomaly information 702, to an NMC, such as, NMC 704. Accordingly, in one or more of the various embodiments, NMC 704 may be arranged to analyze the network traffic that may be associated with the anomaly to expand upon or annotate anomaly information 702 to provide annotated anomaly information 706. As shown in this example, NMC 704 may be arranged to have access to some information related to anomaly that may be unavailable to the anomaly detection service that provided anomaly information 702.

In this non-limiting example, the anomaly information provided to NMC 704 may include information, such as: Anomaly: Too many 404 status codes; User: Apache; Timestamp: 3/4/2018 12:44 UTC; IP Address: 192.168.1.200; or the like. Accordingly, as shown in this example, in some embodiments, NMC 704 may be arranged to employ anomaly information 702 and the network traffic information to generate annotated anomaly information 704 that includes information, such as: Anomaly: Too many 404 status codes; Service: Apache Webserver; System User: Apache; Timestamp: 3/4/2018 12:44 UTC; Service IP Address: 192.168.1.200; Client User: janedoe; Client ID Address: 192.168.2.10; Client Login Time: 3/4/2018 12:24 UTC; Protocols: TCP, RTP; Related Network Flows: [ . . . ]; or the like.

Accordingly, in one or more of the various embodiments, NMCs may be arranged to employ annotated anomaly information to generate anomaly profiles or to associate anomalies with a given anomaly profile. Likewise, in some embodiments, the annotated anomaly information may be employed to determine the type or features of the investigative agents or where to send them to collect additional information about the anomaly.

In this example, the anomaly information provided to NMC 704 does not include information about the client or user client. In this example, the anomaly detection service that provided anomaly information 702 was able to determine that the system user Apache is associated with the web server exhibiting anomalous behavior but, in this example, the anomaly detection service is unable to discover the client user associated with anomaly. Accordingly, in this example, NMC 704 may determine the client user or client computer and use that information to determine where to direct investigative agents to investigate the anomaly.

In one or more of the various embodiments, anomaly profiles, such as, anomaly profile 708 may be comprised of various information, such as, anomaly information 710, investigative information 712, resolution information 714, user annotation information 716, or the like. In some embodiments, anomaly profiles may represent the attributes for classes or categories of anomalies. And, in some embodiments, anomaly profile instances may represent the attributes of a single anomaly, such as, pending anomalies that may be under investigation.

In some embodiments, the inference engine may be arranged to evaluate anomaly profile instances to determine a risk level that may be associated with the anomaly. In this context, an anomaly profile instance is an anomaly profile that may be based on the anomaly information and investigative information of an anomaly that is under investigation. In contrast, a regular anomaly profile may be based the anomaly information, investigative information, resolution information, or annotation information that may have been determined during the detection or investigation of previously occurring anomalies. In some embodiments, regular anomaly profiles may include one or more attributes based on previously encountered occurrences of an anomaly. They may include aggregate values, such as, median, mean, or the like. Also, in some embodiments, anomaly profiles may include meta-data such as standard deviation, variance, totals/sums, or the like, for one or more of the numerical attributes.

Accordingly, in one or more of the various embodiments, anomaly profiles and anomaly profile attributes may provide a fingerprint that may be used for associating risk levels with anomalies. For example, in some embodiments, anomalies that produce anomaly profile instances that closely match existing anomaly profiles that are associated with malicious anomalies may be flagged as malicious based on the history of previously investigated anomalies.

In some embodiments, inference engines may be arranged to employ machine learning to classify or predict the risk level associated with an anomaly. Accordingly, in some embodiments, one or more risk classifiers may be trained to classify or predict anomaly risk levels based on anomaly profiles. Accordingly, in one or more of the various embodiments, anomaly profile instances may be provided as inputs to a machine learning system that may classify the associated anomaly. For example, in some embodiments, one or more anomaly profile instance attributes may be represented as a vector of feature attributes that may be classified by a deep learning artificial neural network to determine a risk level for the associated anomaly.

In one or more of the various embodiments, anomaly profiles, such as, anomaly profile 708 may be represented using various data structures or data formats, XML, JSON, or the like, that enable the attribute identifiers and attribute values to be captured. Also, in some embodiments, anomaly profiles may be stored in one or more databases or files.

Generalized Operations

FIGS. 8-11 represent generalized operations for automated risk assessment based on machine generated investigation in accordance with one or more of the various embodiments. In one or more of the various embodiments, processes 800, 900, 1000, and 1100 described in conjunction with FIGS. 8-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-11 may be used for correlating causes and effects associated with network activity based on network behavior in accordance with at least one of the various embodiments or architectures such as those described in conjunction with FIGS. 4-7. Further, in one or more of the various embodiments, some or all of the actions performed by processes 800, 900, 1000, and 1100 may be executed in part by network monitoring engine 322, inference engine 324, analysis engine 326, anomaly engine 327, or the like, running on one or more processors of one or more network computers.

Figure 8:
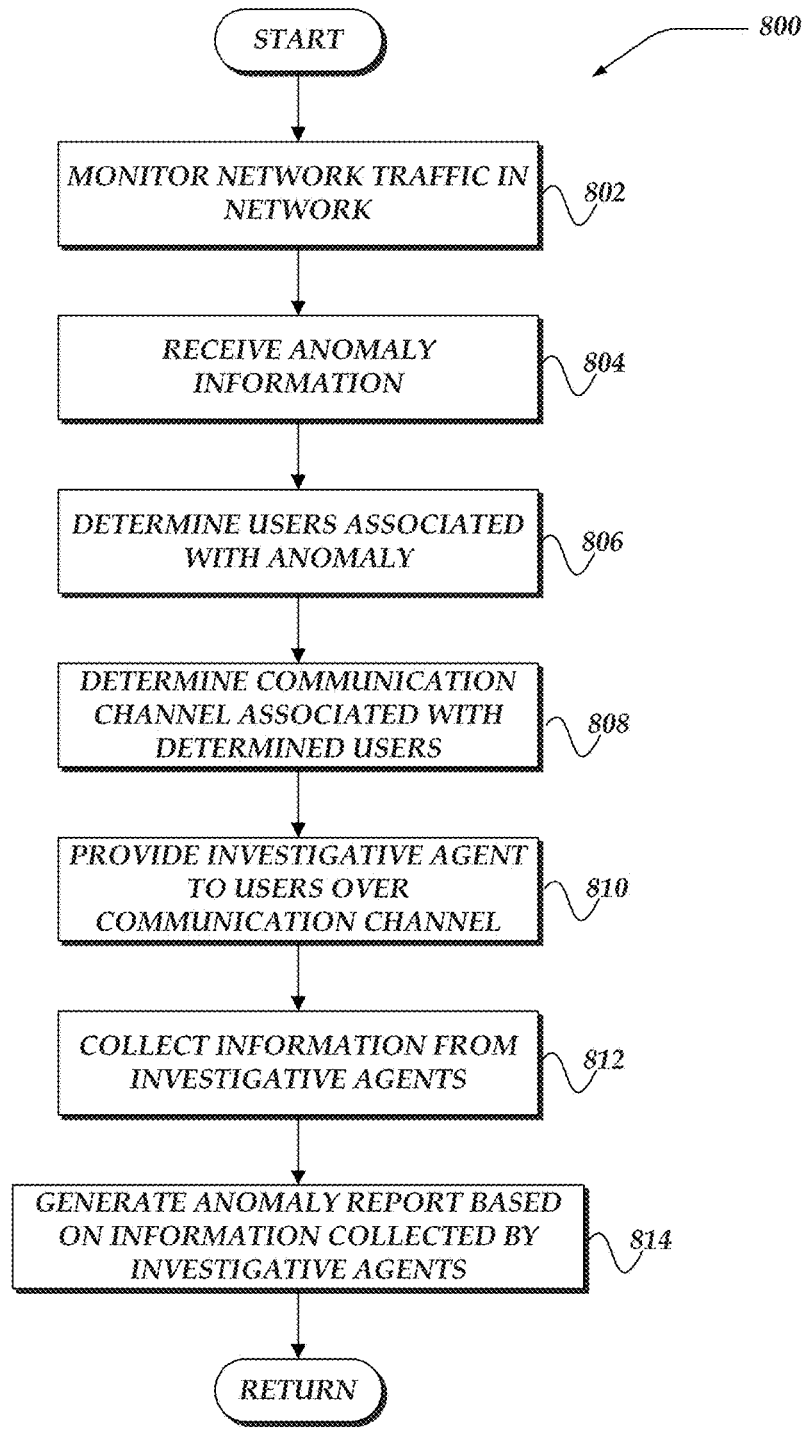
FIG. 8 illustrates an overview flowchart of a process for automated risk assessment based on machine generated investigations in accordance with one or more of the various embodiments.

FIG. 8 illustrates an overview flowchart of process 800 for automated risk assessment based on machine generated investigations in accordance with one or more of the various embodiments. After a start block, at block 802, in one or more of the various embodiments, one or more NMCs may be arranged to monitor network traffic in one or more networks. In one or more of the various embodiments, one or more NMCs may be arranged to collect one or more metrics or other information based on monitoring the network traffic in the monitored networks. As described above, NMCs may be arranged to monitor the network traffic associated with various entities in the monitored networks.

At block 804, in one or more of the various embodiments, the one or more NMCs may receive anomaly information for one or more anomalies that may be detected in the monitored networks. As described above, in some embodiments, an organization may deploy or configure one or more services that may be arranged to detect anomalous activity or anomalous conditions based on the monitoring of various metrics or performance indicators. One of ordinary skill in the art will appreciate that anomaly detection services may be enabled to be configured to identify various types of anomalies. Accordingly, in some embodiments, anomaly detection services may be arranged to provide anomaly information in the form of events, messages, notifications, log records, or the like, to one or more systems that may be registered as observers or subscribers of a given service. Thus, in some embodiments, NMCs may be registered to receive anomaly information from one or more anomaly detection services. Generally, in some embodiments, anomaly detection services may be arranged to provide anomaly information using one or more well-known structured formats (e.g., JSON, XML, or the like) that enable NMCs to semantic or logically parse the anomaly information.

Further, in one or more of the various embodiments, one or more NMCs may be arranged to provide anomaly detection services for one or more anomalies. For example, in some embodiments, as described above, NMCs may be arranged to collect various metrics associated with monitored network activity or network entities. Accordingly, in some embodiments, one or more metrics may be associated with ranges, threshold values, or the like, that may be used to identify anomalous conditions for the one or more metrics. In some embodiments, one or more NMCs may be arranged to provide anomaly detection services for one or more other NMCs. Also, in some embodiments, an anomaly engine running on a single NMC may provide anomaly information to an inference engine running on the same NMC.

At block 806, in one or more of the various embodiments, the one or more NMCs may be arranged to determine one or more users that may be associated with the anomaly. In one or more of the various embodiments, anomaly information may include one or more indicators that may be employed by NMCs to determine users that may be associated with the anomaly, such as, user identifiers, endpoint/entity identifiers, application names, anomaly type, or the like. In some embodiments, these users may be considered target users.

Further, in one or more of the various embodiments, NMCs may be arranged to expand upon the information provided by anomaly detection services. Accordingly, in one or more of the various embodiments, NMCs may be arranged to employ information obtained or derived from the monitored network traffic to annotate the anomaly information with additional information that may not have been provided by the anomaly detection service. As described above, this may include determining one or more users that may be associated with the activity that caused the anomaly event.

Also, in one or more of the various embodiments, NMCs may be arranged to enable one or more user hierarchies systems to be respected or applied. For example, a user may be configured to be a supervisor of one or more users. Or, for example, one or more users may be associated by grouping based on their organization, roles, types, location, capabilities, or the like, or combination thereof. Thus, in some embodiments, NMCs may be configured to determine that one or more users that may be supervisors, group members, team members, or the like, may be determined to be associated with the anomaly. For example, if the anomaly is determined to be associated with user A, the supervisor of user A may be automatically associated with the same anomaly as well. Or, for example, if user C is determined to be the user whose activity is associated with the anomaly and user D is associated with the application user C was using when the anomaly occurred, both user C and user D may be associated with the anomaly or otherwise considered target users.

In one or more of the various embodiments, NMCs may be arranged to employ configuration information to determine how users may be associated with anomalies. Thus, in some embodiments, organizations may provide configuration information that supports their policies or requirements.

At block 808, in one or more of the various embodiments, the one or more NMCs may be arranged to determine one or more communication channels that may be associated with the one or more determined users. In one or more of the various embodiments, NMCs may be arranged to employ configuration information to determine the communication channels for the one or more associated users. In some embodiments, the communication channel for a user may be associated with one or more devices or computers that are also associated with the user, such as, a mobile telephones, client computers, pagers, or the like. Also, in some embodiments, a communication channel may be associated with one or more applications that may be used or accessible by the users.

In some embodiments, communication channels may include various communication modalities, such as, email, SMS, MMS, push notifications, web applications, mobile telephone applications, or the like.

Further, in one or more of the various embodiments, communication channels may be rank ordered based on priority, reliability, cost, latency, or the like. In some cases, communication channels may be arranged into relationships such that if one communication channel fails to communicate with a targeted user another communication channel may be used. Or, in some embodiments, NMCs may be arranged use some or all communication channels associated with users at the same time.

Also, in some embodiments, NMCs may be arranged to employ one or more external or third party services that provide and manage the communication channels that may be used to reach a user. For example, an NMC may be arranged to integrate with a third-party messaging service that delivers or facilitates communication with one or more user or one or more investigative agents.

At block 810, in one or more of the various embodiments, the one or more NMCs may be arranged to provide one or more investigative agents to the target users over the one or more determined communication channels. As described above, investigative agents may be used to collect additional information from one or more users that may be associated with the anomaly. In some embodiments, investigative agents may be selected based on various factors, such as, the communication channel, client device, user device, anomaly type, anomaly profile, or the like. In some embodiments, NMCs may be arranged to employ configuration information to associate investigative agents with users, devices, entities, networks, communication channels, anomalies, or the like.

In one or more of the various embodiments, one or more investigative agents may be pre-deployed onto one or more devices associated with a user. For example, in some embodiments, an investigative agent may be a smart-phone application that a user has installed previously. In some embodiments, investigative agents may include automated SMS based agents, web pages, dialog boxes, or the like, that may be presented or otherwise made available to users via one or more communication channels.

At block 812, in one or more of the various embodiments, the one or more NMCs may be arranged to collect investigative information from the one or more investigative agents. In one or more of the various embodiments, investigative agents may be deployed to collect additional information that may be associated with the anomaly. In some embodiments, the investigative agent may be arranged to collect one or more local metrics from the client device, such as, location information, motion information, temperature, pressure, or the like.

In one or more of the various embodiments, investigative agents may be arranged to provide one or more user-interfaces that may be presented to target users. Accordingly, in one or more of the various embodiments, investigative information may include information that is collected from the user via direct interaction with the user. In some embodiments, this information may include additional security credentials, confirmation that the user is performing activity associated with the anomaly, or the like. In some embodiments, investigative agents may provide a multi-step interactive session that asks a user several questions or otherwise requires two or more interactions.

In one or more of the various embodiments, the investigative information collected by the investigative agent, including the absence of an expected user responses, may be provided to the NMC via the same or different communication channel as used to provide the investigative agent to the user.

At block 814, in one or more of the various embodiments, the one or more NMCs may be arranged to generate one or more reports based on the information provided by the investigative agents, the anomaly, or the like. In one or more of the various embodiments, NMCs may be arranged to employ some or all of the investigative information to evaluate the risk that may be associated with the anomaly. Accordingly, in one or more of the various embodiments, NMCs may be arranged to generate reports, such as, notifications, log records, alerts, alarms, or the like, based on the evaluation of the anomaly.

In one or more of the various embodiments, NMCs may be arranged to execute or recommend one or more actions in response an evaluation of the anomalies risk. For example, in some embodiments, if an investigative agent is unsuccessful in obtaining some required investigative information (e.g., user location, passwords, pin numbers, or the like), the NMC may be arranged to disable the associated user from accessing the network. Similarly, in some embodiments, if the investigative information includes information that indicates the anomaly is harmless rather than malicious, the NMC may be arranged to take no action.

In one or more of the various embodiments, NMCs may be arranged to employ configuration information to map actions to anomalies or anomaly profiles. Accordingly, in some embodiments, organization may be enabled to customize one or more responses to various anomalies based on the needs of the organization. Next, control may be returned to a calling process.

Figure 9:
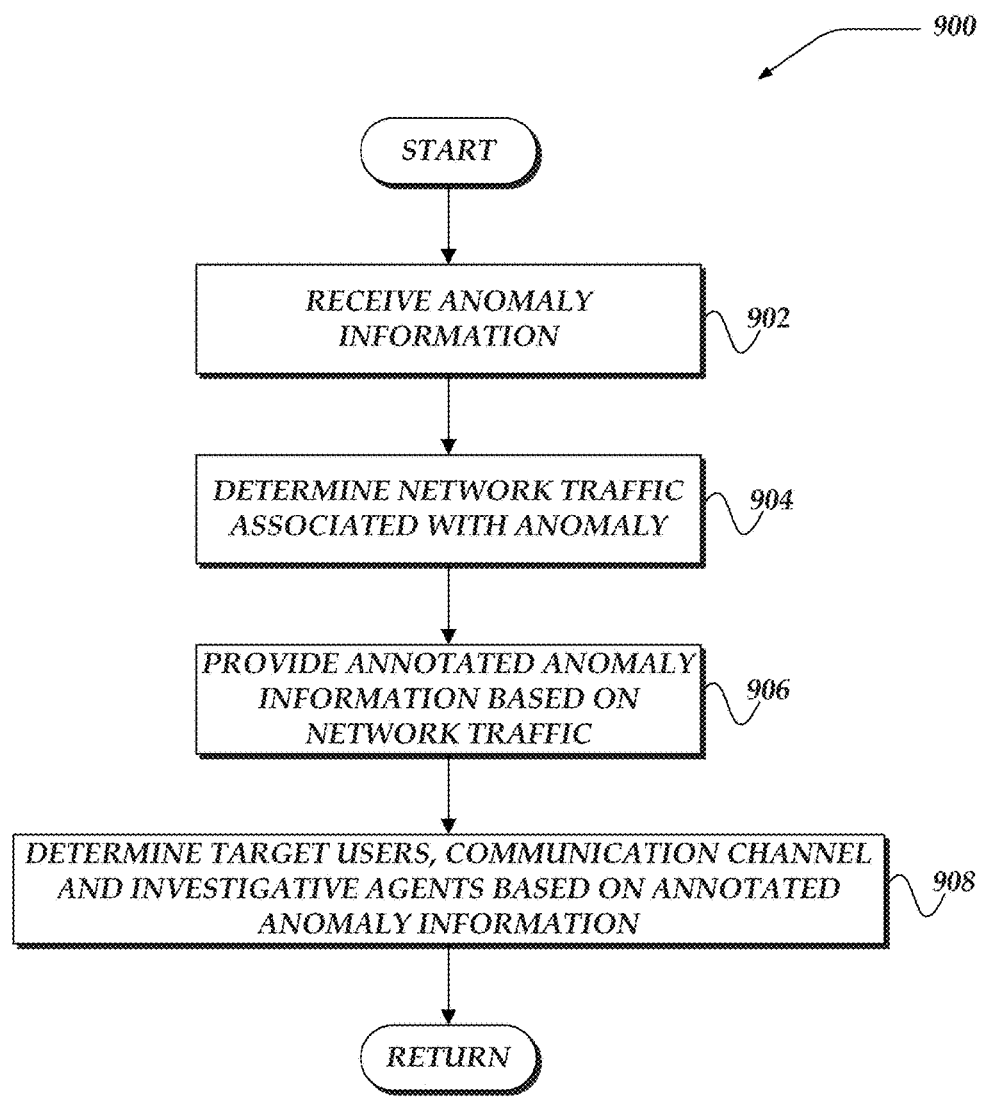
FIG. 9 illustrates a flowchart of a process for annotating anomaly information for automated risk assessment based on machine generated investigations in accordance with one or more of the various embodiments.

FIG. 9 illustrates a flowchart of process 900 for annotating anomaly information for automated risk assessment based on machine generated investigations in accordance with one or more of the various embodiments. After a start block, at block 902, in one or more of the various embodiments, an NMC may receive anomaly information from one or more anomaly detecting services. As described above, in some embodiments, NMCs may be provided information associated with anomalies that may be detected by one or more anomaly detection services. In some embodiments, in some cases, most anomaly detection services may be disabled from accessing, monitoring, or evaluating network traffic as compared to NMCs. In some embodiments, anomaly detection services may be configured to monitor one or more services or metrics to identify one or more anomalies. Accordingly, in one or more of the various embodiments, anomaly detection services may be expected to have limited scope or analysis capabilities as compared to NMCs. For example, an anomaly detection service may be enabled to periodically test if a service or endpoint is "on the network" by periodically pinging the service or endpoint to see if the service or endpoint is responds. Also, for example, another anomaly detection service may be configured to monitor resource utilization associated with one or more services or computers. Thus, in this example, the anomaly detection service may be configured to consider resource utilization that exceeds a defined threshold as anomalous.

In one or more of the various embodiments, anomaly detection services may be configured to provide messages, events, notification, log entries, API calls, or the like, in response the detection of an anomaly. The conditions for determining if activity or performance metrics are anomalous may vary depending on the needs of the organization.

Accordingly, in some embodiments, anomaly detection services may provide notice, one or way or another, to the NMC of the detection of an anomaly. In some embodiments, such notices may include some or all of the information the anomaly detection service discovered about the anomaly. In some embodiments, this anomaly information may include some details about the activity that the anomaly detection service associated with the occurrence of the anomaly.

In some embodiments, the anomaly information may be comprised of one or more fields, properties, attributes, or the like, that the NMC may be configured to recognize or otherwise map to fields, properties, or attributes that have semantic meaning to the NMC. However, in most cases, the anomaly information may be limited as compared to the comprehensive metrics or analysis that may be available to the NMC.

At block 904, in one or more of the various embodiments, the NMC may be arranged to determine the network traffic that may be associated with the anomaly based on the anomaly information. As described above, NMC may be arranged to employ various techniques to discover various characteristics of monitored networks based on measured metrics, network activity, applications, users, or the like. Accordingly, the NMC may be arranged to determine some or all of the network traffic that may be associated with the anomaly.

At block 906, in one or more of the various embodiments, the NMC may be arranged to provide annotated anomaly information based on the network traffic associated with the anomaly. Also, as described above, NMCs may be arranged to employ one or more techniques and semantic reasoning to identify relationships between network flows, entities, applications, users, or the like.

Accordingly, in one or more of the various embodiments, given the anomaly information, the NMC may be arranged to determine additional information that may be associated with the anomaly based on observation, discovery, or inference. For example, if the anomaly information identifies one or more servers that are associated with an anomaly, the NMC may determine applications, users, additional network activity, or the like, that may be associated with the one or more servers.

In one or more of the various embodiments, NMCs may enrich or annotate the information provided by the anomaly detection service to provide additional insights or reasoning ability regarding the anomaly.

At block 908, in one or more of the various embodiments, the NMC may be arranged to determine one or more target users, communication channels, investigative agents, or the like, based the annotated anomaly information. In some embodiments, NMCs may be enabled to select one or more target users that may be provided investigative agents to collect additional investigative information. Also, in some embodiments, NMCs may be arranged to select the particular investigative agent for each target user or target entity based on the annotated anomaly information and configuration information. Accordingly, in one or more of the various embodiments, NMCs may select investigate agents that are compatible or otherwise competent for collecting the desired investigative information from a given target user or target entity.

Next, in some embodiments, control may be returned to a calling process.

Figure 10:
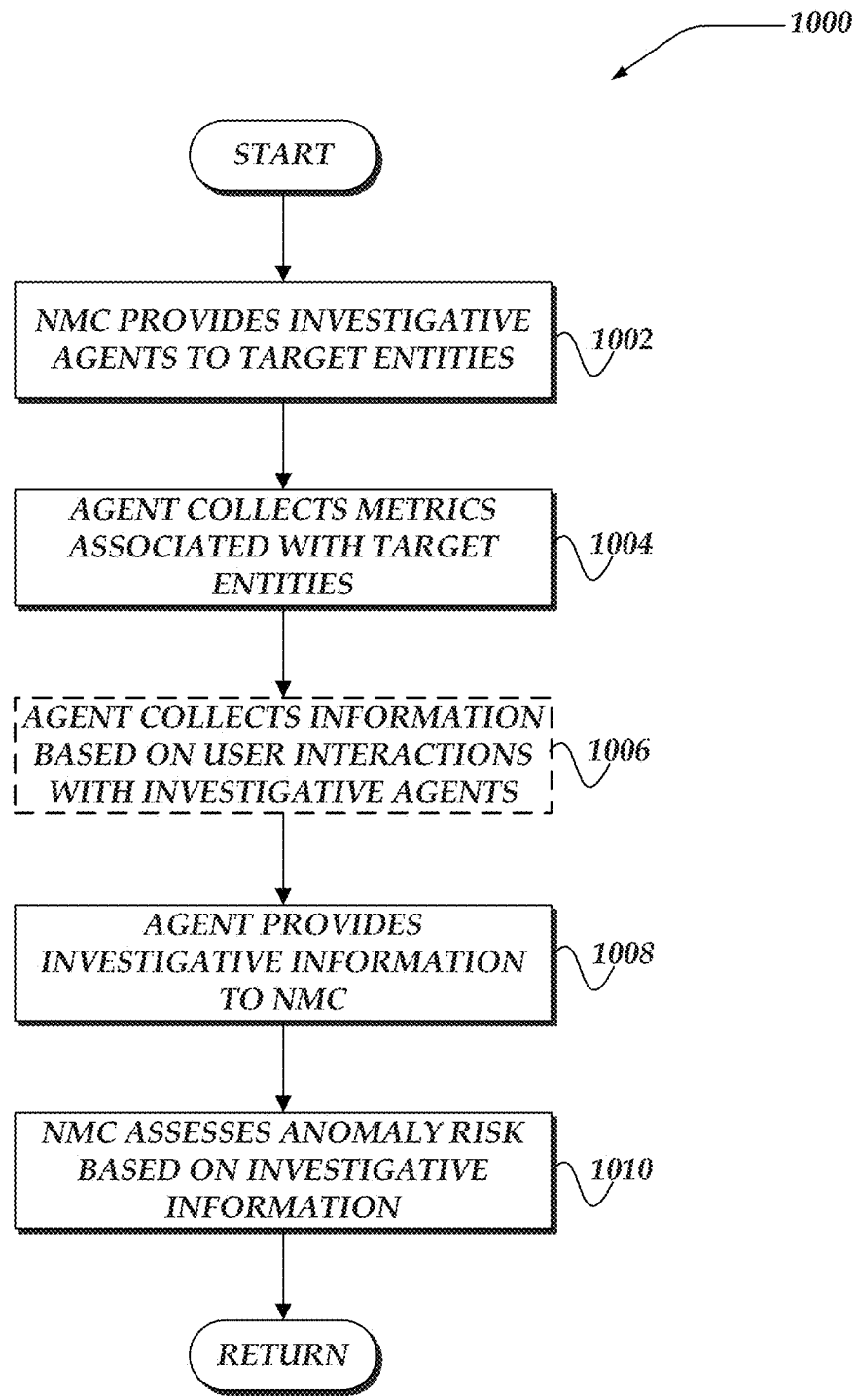
FIG. 10 illustrates a flowchart of a process for employing investigative agents for automated risk assessment based on machine generated investigations in accordance with one or more of the various embodiments.

FIG. 10 illustrates a flowchart of process 1000 for employing investigative agents for automated risk assessment based on machine generated investigations in accordance with one or more of the various embodiments. After a start block, at block 1002, in one or more of the various embodiments, an NMC may be arranged to provide one or more investigative agents to one or more target entities. As described above, investigative agents may be delivered via one or more communication channels. In one or more of the various embodiments, investigative agents may include one or more user interfaces that enable target users to contribute to the investigative information by interacting with the investigative agents. Also, in some embodiments, investigative agents may be arranged to automatically measure or more metrics to acquire investigative information as well.

In one or more of the various embodiments, different target users or target entities may be provided different types of investigative agents depending on the anomaly or the entities that may be associated with the anomaly. In some embodiments, NMCs may be arranged to employ configuration information to determine which investigative agent to provide to a given target user or target entity. In some embodiments, client computers may have one or more investigative agents pre-installed or pre-deployed. Accordingly, in some embodiments, communication from the NMC may trigger the pre-installed or pre-deployed investigative agents to activate.

In one or more of the various embodiments, investigative agents may be client server based. Accordingly, in some embodiments, an investigative agent client may be provided to a target user or target entity while a corresponding investigative agent server may be hosted on another server computer, such as, the NMC, or other network computer.

At block 1004, in one or more of the various embodiments, the one or more investigative agents may be arranged to collect one or more metrics associated with the one or more target entities. In one or more of the various embodiments, the metrics collected by the investigative agents may be related to various operations or components of the one or more target entities. In some embodiments, metrics may include geolocation/environment information that may be used to compare the location of a target user to location of the one or more target entities that are associated with the anomaly. For example, if the target entity is a mobile telephone that has geolocation features, the location of the mobile telephone may be compared to the locations associated with the anomaly. Accordingly, continuing with this example, if the anomaly is associated with user activity at a particular workstation and the mobile telephone is located away from the workstation, the inference engine may infer a high risk value because the location of the mobile telephone may indicate that the target user is not performing the actions associated with the anomaly.

In one or more of the various embodiments, investigative agents may be executed on one or more entities that are peers of the entities that are associate with the anomalous activity. Accordingly, in some embodiments, metrics collected on the peer entities may be used to infer the level of risk associated with anomaly. In some embodiments, if one or more metrics associated with the target entity significantly deviate from its peer entities, the inference engine may be arranged to increase the risk level associated with an anomaly. For example, in embodiments, one or more metrics associated with the target entity or the anomaly may be absent on the peer entities. Accordingly, in this example, the different or unique activity observed on the target entity associated with the target user may indicate that the anomaly may be malicious.

At block 1006, in one or more of the various embodiments, optionally, the one or more investigative agents may collect information based on interactions with the one or more target users.

Accordingly, in one or more of the various embodiments, investigative agents may be arranged to solicit one or more actions or behaviors from the one or more target users. In some embodiments, the investigative agents may be arranged to initiate a multi-step interaction with one or more target users. In some embodiments, the investigative agents may display user-interfaces or otherwise provide signals to indicate that the target user should interact with the investigative agent. In some embodiments, this may include providing a request for information that may or may not help determine if the anomaly is associated with malicious activity.

In one or more of the various embodiments, the inference engine may be arranged to provide investigative agents to users other than the one or more target users directly associated with the anomaly. Accordingly, in some embodiments, such investigative agents may be arranged to solicit information from these other users. Thus, in some embodiments, the inference engine may be arranged to employ both the investigative information associated with the target user and the investigative information provided by the other users to evaluate the risk level of the anomaly.

In one or more of the various embodiments, the other users may be provided information based on information provided by a target user. In some embodiments, the investigative agent provided to the other users in response to a detected anomaly may include interactions or responses provided by a target user associated with the same anomaly. Likewise, the investigative agent provided to the other users may include a report that shows some or all of the investigative information or some or all of the anomaly information.

At block 1008, in one or more of the various embodiments, the one or more investigative agents may provide the investigative information to the NMC. In one or more of the various embodiments, the one or more investigative agent may communicate the investigative information to the inference engine over the communication channel. In some embodiments, the investigative agent may be arranged to employ a different communication channel than the one used to provide the investigative agent. In some embodiments, investigative agents may be arranged to progressively send portions of the investigative information to the inference engine. Accordingly, in some embodiments, investigative agents may quickly send information to the inference engine as it is determined. In some embodiments, this enables the inference engine to begin evaluating the risk level of the anomaly as soon as the first portion of investigative information are provided. Also, in one or more of the various embodiments, investigative agents may be arranged to continuously stream one or more metrics to the inference engine. For example, in some embodiments, an investigative agent may immediately collect one or more metrics, such as, geolocation information, and provide it the inference engine while it collects additional investigative information from the user. Accordingly, in this example, if the geolocation information indicates the target user present or otherwise associated with the anomalous activity, the inference engine may immediately determine that the anomaly is malicious rather than waiting for additional investigative information to be provided.

At block 1010, in one or more of the various embodiments, the NMC may be arranged to assess the risk of the anomaly based on the investigative information. As mentioned above, anomaly information and investigative information may be combined into an anomaly profile or an instance of an anomaly profile. Accordingly, the inference engine may evaluate the anomaly profile instance profile to determine a risk level that may be associated with the anomaly. In this context, an anomaly profile instance is a profile that is based on the anomaly information and investigative information of an anomaly that is under investigation. In contrast, an regular anomaly profile may be based the anomaly information and investigative information associated with previously occurring anomalies. In some embodiments, regular anomaly profiles may include one or more attributes based on previously encountered occurrences of an anomaly. They may include aggregate values, such as, median, mean, or the like. Also, in some embodiments, anomaly profiles may include meta-data such as standard deviation, variance, totals/sums, or the like.

Accordingly, in one or more of the various embodiments, anomaly profiles and anomaly profile attributes may provide a fingerprint that may be used for associating risk levels with anomalies. For example, in some embodiments, anomalies that produce anomaly profile instances that closely match existing anomaly profiles associated with malicious anomalies may be flagged as malicious based on past history.

In some embodiments, inference engines may be arranged to employ machine learning to classify or predict the risk level associated with an anomaly. Accordingly, in some embodiments, one or more risk classifiers may be trained to classify or predict risk level based on anomaly profile information. Accordingly, in one or more of the various embodiments, anomaly information or investigative information may be provided as inputs to a machine learning system that may classify the associated anomaly. For example, in some embodiments, one or more anomaly profile instance attributes may be represented as a vector of feature attributes that may be classified by a deep learning artificial neural network to determine a risk level for the associated anomaly.

Next, in some embodiments, control may be returned to a calling process.

Figure 11:
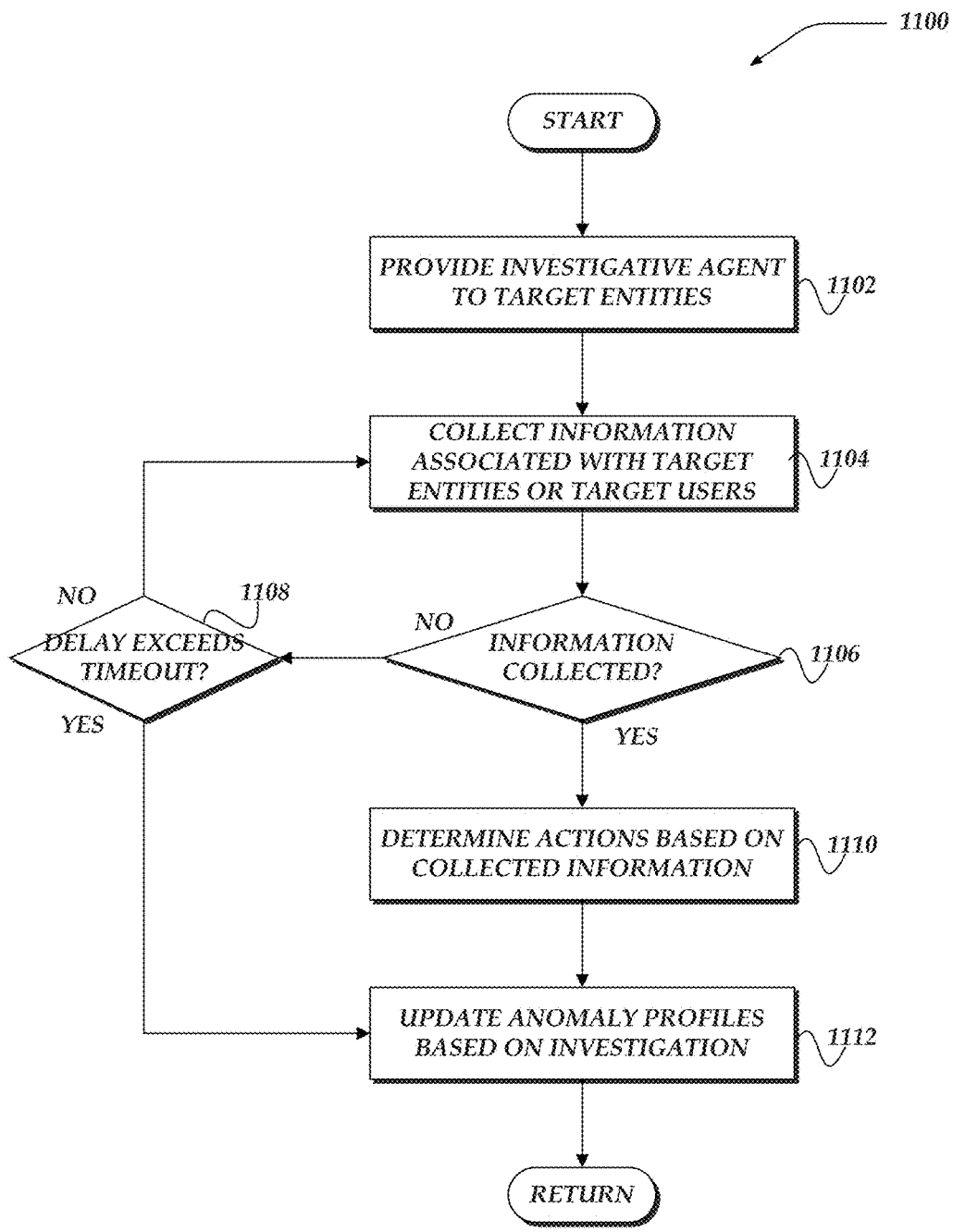
FIG. 11 illustrates a flowchart of a process for employing investigative agents to collect information that may be used to update anomaly profiles for automated risk assessment based on machine generated investigations in accordance with one or more of the various embodiments.

FIG. 11 illustrates a flowchart of process 1100 for employing investigative agents to collect information that may be used to update anomaly profiles for automated risk assessment based on machine generated investigations in accordance with one or more of the various embodiments. After a start block, at block 1102, in one or more of the various embodiments, an NMC may be arranged to provide one or more investigative agents to one or more target entities.

At block 1104, in one or more of the various embodiments, the NMC may be arranged to collect investigative information associated with the target entities or target users. As described above, one or more investigative agents may be deployed to collect investigative information that is associated with an anomaly.

At decision block 1106, in one or more of the various embodiments, if the investigative information has been collected, control may flow to block 1110; otherwise, control may flow to decision block 1108. As described above, investigative agents may be arranged to conduct multi-step or long-running investigations to collect the investigative information that may be sufficient to evaluate the anomaly.

At decision block 1108, in one or more of the various embodiments, if a delay in receiving the investigative information exceeds a timeout value, control may flow to block 1112; otherwise, control may loop back to block 1104. In some embodiments, the investigative agents may be prevented for launching or communicating with the target entity or the inference engine. In some cases, the anomaly may be inhibiting the ability of the investigative agents to communicate or otherwise operate as expected. Also, in some embodiments, investigative agents may be arranged to collect investigative agent from one or more target users. Thus, in some embodiments, if a target user fails acknowledge an investigative agent, the inference engine may include the absence of a require response evidence of malicious activity. Note, in some embodiments, the inference engine may employ configuration information, machine learning, historical trends, or the like, or combination thereof, to determine the timeout values.

At block 1110, in one or more of the various embodiments, the NMC may be arranged to determine one or more actions to take based on the collected investigative information. In one or more of the various embodiments, the inference engine may be arranged to consider the investigative information to evaluate the risk that may be associated with anomaly.

In some embodiments, as discussed above, the inference engine may develop an anomaly profile instance for a pending anomaly. The anomaly profile instance may be employed to classify the anomaly to determine its risk level. Accordingly, in some embodiments, an inference engine, anomaly engine, analysis engine, or the like, may be arranged to perform various actions is the risk value associated with an anomaly exceeds a defined threshold or otherwise meets defined conditions.

In one or more of the various embodiments, actions may include raising notifications, notifying one or more users, notifying another service (e.g., trouble-ticket system, or the like), executing one or more programs or scripts, or the like, or combination thereof. Accordingly, in one or more of the various embodiments, NMCs may be arranged to employ configuration to determine the appropriate actions, if any, to perform.

At block 1112, in one or more of the various embodiments, the NMC may be arranged to update one or more anomaly profiles that may be associated with the anomaly based on the investigative information. As described above, the inference engine may be arranged to produce or maintain anomaly profiles as anomalies are discovered and investigated. Accordingly, in some embodiments, overtime anomaly profiles may be updated based on recent investigations or evaluations.

In some embodiments, NMCs may be arranged to include resolution information in the anomaly profiles. In one or more of the various embodiments, one or more values in an anomaly profile may be associated with the actions or action results that may have been performed in response to the discovery of the anomaly. Accordingly, in some embodiments, anomaly profiles may be arranged to maintain a list of action, action-result tuples that may be employed in the classifying, evaluating, investigation, or resolving subsequent anomalies.

Also, in some embodiments, NMCs may be arranged to enable one or more designated users (including target users) to annotate one or more anomaly profiles with notes, comments, machine learning labels, tags, grades, or the like. Accordingly, in one or more of the various embodiments, the user supplied annotation information may be employed in the classifying, evaluating, investigation, or resolving subsequent anomalies.

Next, in some embodiments, control may be returned to a calling process.

In one or more of the various embodiments, the period for re-training correlation models may be impacted by other factors, including correlation model priority, correlation model category, or the like. Accordingly, in one or more of the various embodiments, selecting a correlation model for re-training may depend on various characteristics of the network activity or activity profiles associated with the correlation model, such as, entities, services, applications, sources, destinations, users, or the like, or combination thereof. For example, one or more correlation models associated with mission critical entities may be configured to be re-trained more often than one or more correlation models that may be associated with less important entities. As these determinations may be dependent on the operational considerations of the monitored networks, NMCs may be arranged to employ configuration information provided by configuration files, file system policies, pre-fetch policies, built-in defaults, user input, or the like, combination thereof, to determine re-training frequency or re-training sensitivity. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic using on one or more network computers over one or more networks, wherein the execution of instructions by the one or more network computers perform the method comprising:
    instantiating a monitoring engine to perform actions, including:
        providing anomaly information that is associated with one or more anomalies that are associated with monitored network traffic; and
    instantiating an inference engine that performs actions, including:
        determining one or more users that are associated with the one or more anomalies associated with one or more portions of the monitored network traffic;
        determining a communication channel that is associated with the one or more users based on the one or more anomalies and the one or more portions of the monitored network traffic, wherein the communication channel is separate from the monitored network traffic;
        employing the communication channel to provide one or more investigative agents to the one or more users;
        annotating the anomaly information to include one or more attributes based on one or more metrics that are associated with the one or more portions of the monitored network traffic that is associated with the one or more anomalies;
        determining the one or more investigative agents based on the annotated anomaly information;
        employing the annotated anomaly information to further determine the communication channel;
        collecting investigative information from the one or more investigative agents over the communication channel; and
        providing a risk value that is associated with the one or more anomalies based on the investigative information.

2. The method of claim 1, wherein collecting the investigative information, further comprises, monitoring one or more interactions of the one or more users with the one or more investigative agents.

3. The method of claim 1, further comprising employing one or more of an anomaly engine on the one or more network computers, one or more network monitoring computers, or one or more services that are separate from the one or more network computers to provide the anomaly information.

4. The method of claim 1, wherein collecting the investigative information, further comprises:
    employing the investigative agent to determine one or more target metrics that are associated with one or more of one or more target entities or the one or more users; and
    employing the investigative agent to provide the investigative information to the inference engine using the communication channel.

5. The method of claim 1, wherein collecting the investigative information, further comprises:
    employing the investigative agent to determine one or more target metrics that are associated with one or more interactions with the one or more users; and
    employing the investigative agent to provide the one or more target metrics to the inference engine using the communication channel.

6. The method of claim 1, wherein the inference engine performs further actions, including, determining one or more remediation actions based on the investigative information, wherein the one or more remediation actions includes one or more of quarantining an endpoint, blocking network traffic, or locking a user account.

7. A system for monitoring network traffic in one or more networks:
    one or more network computers, comprising:
        a transceiver that communicates over the one or more networks;
        a memory that stores at least instructions; and
        one or more processors that execute instructions that perform actions, including:
            instantiating a monitoring engine to perform actions, including:
                providing anomaly information that is associated with one or more anomalies that are associated with monitored network traffic; and
            instantiating an inference engine that performs actions, including:
                determining one or more users that are associated with the one or more anomalies associated with one or more portions of the monitored network traffic;
                determining a communication channel that is associated with the one or more users based on the one or more anomalies and the one or more portions of the monitored network traffic, wherein the communication channel is separate from the monitored network traffic;
                employing the communication channel to provide one or more investigative agents to the one or more users;
                annotating the anomaly information to include one or more attributes based on one or more metrics that are associated with the one or more portions of the monitored network traffic that is associated with the one or more anomalies;

determining the one or more investigative agents based on the annotated anomaly information;

employing the annotated anomaly information to further determine the communication channel;

collecting investigative information from the one or more investigative agents over the communication channel; and providing a risk value that is associated with the one or more anomalies based on the investigative information; and one or more client computers, comprising:

a transceiver that communicates over the network;

a memory that stores at least instructions; and one or more processors that execute instructions that perform actions, including:

providing one or more of the one or more portions of the monitored network traffic.

8. The system of claim 7, wherein collecting the investigative information, further comprises, monitoring one or more interactions of the one or more users with the one or more investigative agents.

9. The system of claim 7, further comprising employing one or more of an anomaly engine on the one or more network computers, one or more network monitoring computers, or one or more services that are separate from the one or more network computers to provide the anomaly information.

10. The system of claim 7, wherein collecting the investigative information, further comprises:

employing the investigative agent to determine one or more target metrics that are associated with one or more of one or more target entities or the one or more users; and employing the investigative agent to provide the investigative information to the inference engine using the communication channel.

11. The system of claim 7, wherein collecting the investigative information, further comprises:

employing the investigative agent to determine one or more target metrics that are associated with one or more interactions with the one or more users; and employing the investigative agent to provide the one or more target metrics to the inference engine using the communication channel.

12. The system of claim 7, wherein the inference engine performs further actions, including, determining one or more remediation actions based on the investigative information, wherein the one or more remediation actions includes one or more of quarantining an endpoint, blocking network traffic, or locking a user account.

13. A network computer for monitoring network traffic over one or more networks between two or more computers, comprising:

a transceiver that communicates over the network;

a memory that stores at least instructions; and one or more processors that execute instructions that perform actions, including:

instantiating a monitoring engine to perform actions, including:

providing anomaly information that is associated with one or more anomalies that are associated with monitored network traffic; and instantiating an inference engine that performs actions, including:

determining one or more users that are associated with the one or more anomalies associated with one or more portions of the monitored network traffic;

determining a communication channel that is associated with the one or more users based on the one or more anomalies and the one or more portions of the monitored network traffic, wherein the communication channel is separate from the monitored network traffic;

employing the communication channel to provide one or more investigative agents to the one or more users;

annotating the anomaly information to include one or more attributes based on one or more metrics that are associated with the one or more portions of the monitored network traffic that is associated with the one or more anomalies;

determining the one or more investigative agents based on the annotated anomaly information;

employing the annotated anomaly information to further determine the communication channel;

collecting investigative information from the one or more investigative agents over the communication channel; and providing a risk value that is associated with the one or more anomalies based on the investigative information.

14. The network computer of claim 13, wherein collecting the investigative information, further comprises, monitoring one or more interactions of the one or more users with the one or more investigative agents.

15. The network computer of claim 13, further comprising employing one or more of an anomaly engine on the one or more network computers, one or more network monitoring computers, or one or more services that are separate from the one or more network computers to provide the anomaly information.

16. The network computer of claim 13, wherein collecting the investigative information, further comprises:

employing the investigative agent to determine one or more target metrics that are associated with one or more of one or more target entities or the one or more users; and employing the investigative agent to provide the investigative information to the inference engine using the communication channel.

17. The network computer of claim 13, wherein collecting the investigative information, further comprises:

employing the investigative agent to determine one or more target metrics that are associated with one or more interactions with the one or more users; and employing the investigative agent to provide the one or more target metrics to the inference engine using the communication channel.

18. The network computer of claim 13, wherein the inference engine performs further actions, including, determining one or more remediation actions based on the investigative information, wherein the one or more remediation actions includes one or more of quarantining an endpoint, blocking network traffic, or locking a user account.

19. A processor readable non-transitory storage media that includes instructions for monitoring network traffic over one or more networks using one or more network monitoring computers, wherein execution of the instructions by the one or more network computers perform the method comprising:

instantiating a monitoring engine to perform actions, including:
  providing anomaly information that is associated with one or more anomalies that are associated with monitored network traffic; and
instantiating an inference engine that performs actions, including:
  determining one or more users that are associated with the one or more anomalies associated with one or more portions of the monitored network traffic;
  determining a communication channel that is associated with the one or more users based on the one or more anomalies and the one or more portions of the monitored network traffic, wherein the communication channel is separate from the monitored network traffic;
  employing the communication channel to provide one or more investigative agents to the one or more users;
  annotating the anomaly information to include one or more attributes based on one or more metrics that are associated with the one or more portions of the monitored network traffic that is associated with the one or more anomalies;
  determining the one or more investigative agents based on the annotated anomaly information;
  employing the annotated anomaly information to further determine the communication channel;
  collecting investigative information from the one or more investigative agents over the communication channel; and
  providing a risk value that is associated with the one or more anomalies based on the investigative information.

20. The media of claim 19, wherein collecting the investigative information, further comprises, monitoring one or more interactions of the one or more users with the one or more investigative agents.

21. The media of claim 19, further comprising employing one or more of an anomaly engine on the one or more network computers, one or more network monitoring computers, or one or more services that are separate from the one or more network computers to provide the anomaly information.

22. The media of claim 19, wherein collecting the investigative information, further comprises:
  employing the investigative agent to determine one or more target metrics that are associated with one or more of one or more target entities or the one or more users; and
  employing the investigative agent to provide the investigative information to the inference engine using the communication channel.

23. The media of claim 19, wherein collecting the investigative information, further comprises:
  employing the investigative agent to determine one or more target metrics that are associated with one or more interactions with the one or more users; and
  employing the investigative agent to provide the one or more target metrics to the inference engine using the communication channel.

24. The media of claim 19, wherein the inference engine performs further actions, including, determining one or more remediation actions based on the investigative information, wherein the one or more remediation actions includes one or more of quarantining an endpoint, blocking network traffic, or locking a user account.

* * * * *